Nov. 3, 1964  O. VIELMO  3,155,434
AIR-ACTUATED BRAKING SYSTEM FOR TOWING VEHICLES
Filed July 12, 1962  3 Sheets-Sheet 2
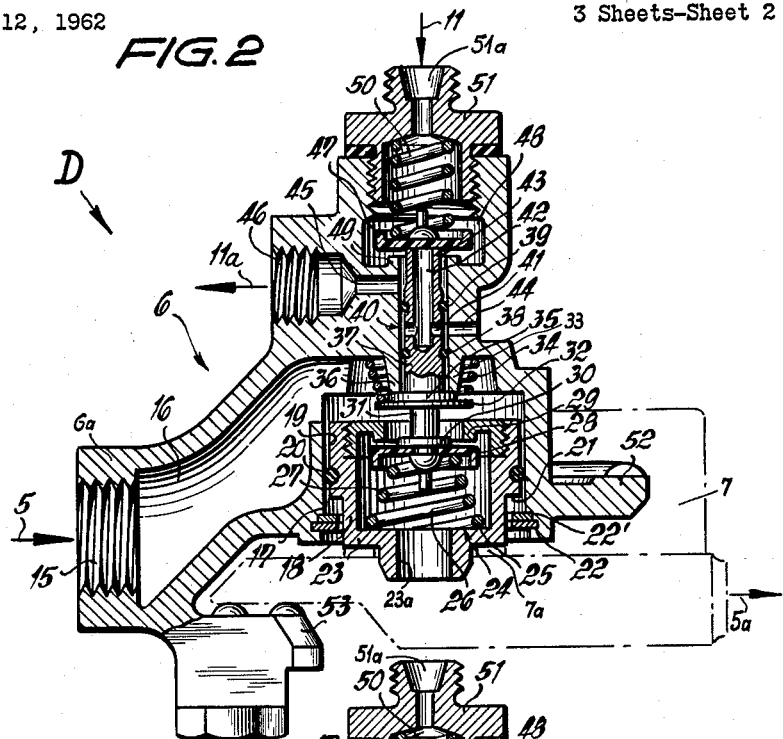
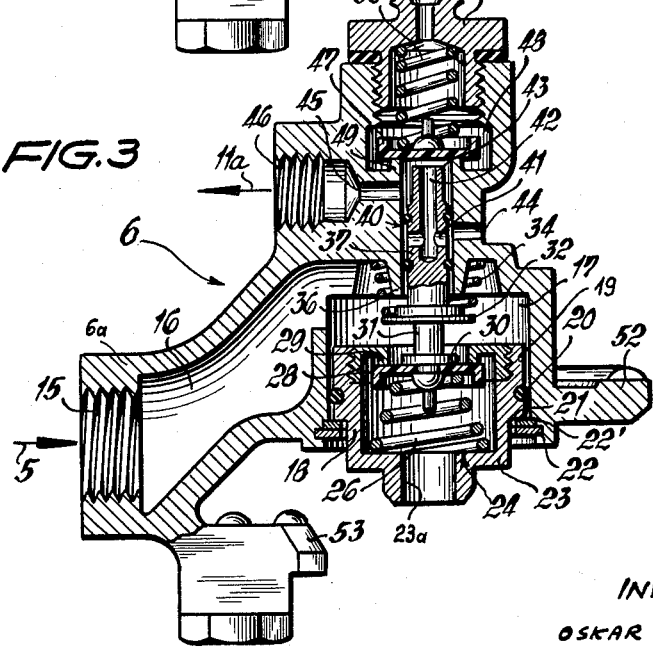
INVENTOR:
OSKAR VIELMO
BY
Michael J. Striker
his ATTORNEY

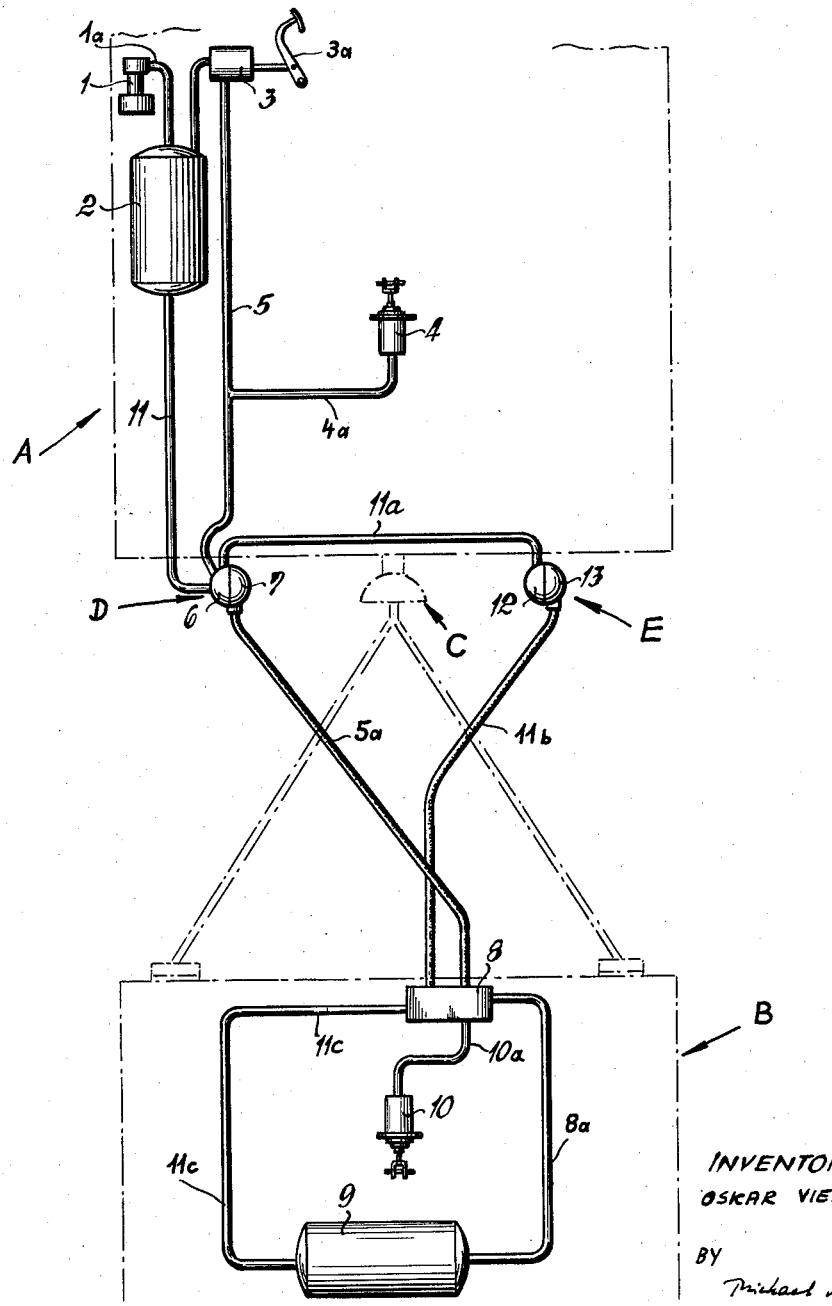

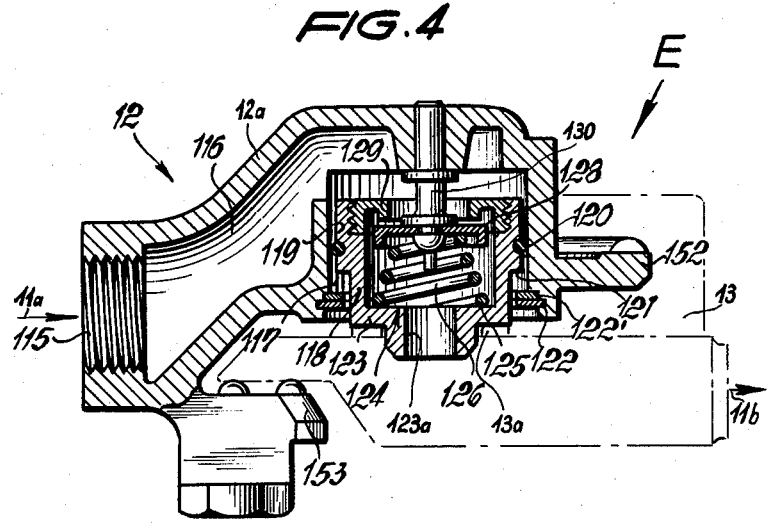

United States Patent Office 3,155,434
Patented Nov. 3, 1964

3,155,434
AIR-ACTUATED BRAKING SYSTEM FOR
TOWING VEHICLES
Oskar Vielmo, Stuttgart-Sonnenberg, Germany, assignor to Robert Bosch G.m.b.H., Stuttgart, Germany
Filed July 12, 1962, Ser. No. 209,404
Claims priority, application Germany, July 14, 1961,
B 63,273
20 Claims. (Cl. 303—7)

The present invention relates to braking systems for automotive vehicles, and more particularly to an improved air-actuated braking system for towing vehicles and their trailers.

An important object of the invention is to provide an air-actuated braking system which is constructed and assembled in such a way that escape of compressed air from its lines is automatically prevented if the coupling or couplings utilized for connecting the supply and/or service lines of the trailer with the corresponding lines of the towing vehicle become detached.

Another object of the invention is ot provide an air-actuated braking system of the just outlined characteristics which is capable of automatically warning the driver that its operation is abnormal, not by producing a signal which may or may not be detected, but rather by applying the brakes on the trailer so that the driver is bound to notice such abnormality.

A further object of the invention is to provide an improved detachable coupling which is especially suited for insertion in the service line of an air-actuated braking system for towing vehicles and their trailers and which enables the designer of the braking system to omit the safety valve or valves which are considered as essential component parts of all such air-actuated braking systems of which I have knowledge at this time.

Still another object of the invention is to provide a coupling of the just outlined characteristics which is constructed and assembled in such a way that it can simultaneously control the flow of compressed air in two independent lines, such as the service line and the supply line of a dual air-actuated braking system.

An additional object of my invention is to provide a very simple but highly reliable detachable coupling for use in air-actuated braking systems of automotive vehicles and their trailers, this coupling being constructed and assembled in such a way that, as soon as its parts become detached from each other, it can send a suitable impulse to the braking mechanism of the trailer to apply the trailer brakes and to thereby warn the driver that the coupling is inoperative.

With the above objects in view, the invention resides in the provision of a braking system comprising a service line including a first section connected with a source of compressed air through the brake valve of the towing vehicle and a second section connected with the relay valve of the trailer, a supply line having a first section connected with the source and a second section connected with the reservoir of the trailer, and a detachable coupling connecting the first sections with the respective second sections. This coupling comprises a first coupling member mounted on the towing vehicle and having two intake ports connected with the first sections and two outlet ports one of which is connected with the second section of the supply line, a normally closed first valve assembly mounted in the coupling member between the inlet port communicating with the first section of the service line and the unconnected outlet port, a normally closed second valve assembly mounted in the coupling member between the ports connected to the sections of the supply line, an operative connection between the two valve assemblies so that one thereof opens automatically when the other is caused to open, a second coupling member which is detachably connected with the first coupling member and which is fixed to the second section of the service line, and actuating means in the second coupling member adapted to automatically open one of the valve assemblies when the coupling is assembled so that the respective sections of the two lines are free to communicate with each other as long as the two coupling members are connected with each other. However, as soon as one of the coupling members is accidentally or intentionally detached from the other coupling member, the vaive assemblies reassume their closed positions and prevent escape of compressed air through the first sections of both lines.

The novel features which are considered as characteristic of the invention are set forth in particular in the appended claims. The invention itself, however, both as to its construction and its method of operation, together with additional objects and advantages thereof, will be best understood from the following detailed description of certain specific embodiments with reference to the accompanying drawings, in which:

FIG. 1 is a diagrammatic view of an air-actuated braking system for a towing vehicle and trailer, this braking system being constructed in accordance with one embodiment of my invention;

FIG. 2 is a central section through a detachable coupling which forms part of the braking system and is utilized for joining two sections of a service line which connects the brake valve on the towing vehicle with the brake valve on the trailer;

FIG. 3 is a similar central section through one member of the coupling which embodies a pair of cooperating valve assemblies adapted to prevent escape of compressed air from the braking mechanism of the towing vehicle when the coupling is detached;

FIG. 4 is a central section through a second detachable coupling which serves as a means for joining two sections of an emergency line connecting the air reservoir of the towing vehicle with the air reservoir of the trailer; and FIG. 5 is a central section through a modified coupling member which may be utilized as a substitute for the coupling member shown in FIG. 3.

Referring now in greater detail to the drawings, and first to FIG. 1, there is shown an air-actuated braking system which is mounted in part on a towing vehicle, such as a truck A, and in part on a trailer B which is attached to the rear end of the vehicle by a conventional hitch C. The braking system of FIG. 1 is of the so-called dual line type as will be more fully explained hereinbelow.

That part of the braking system which is mounted on the vehicle A includes a source of compressed air consisting of an air pump or compressor 1 and a tank 2, the two connected by a pipe 1a. The other part of the braking system which is mounted on the trailer B comprises a relay valve 8 which is connected with the tank 2 by a service line including a first section 5 communicating with the tank and a second section 5a which assumes the form of a flexible hose and which is connected to the relay valve 8. The means for joining the sections 5, 5a consists of a detachable coupling D including a first hollow coupling member 6 which is connected to the discharge end of the section 5 and which is mounted at the rear end of the vehicle A, and a second hollow coupling member 7 which is detachably connected with the coupling member 6 and which is fixed to the intake end of the section 5a.

The section 5 accommodates a brake valve 3 mounted on the vehicle A and controlled by a brake pedal 3a. Downstream of the valve 3, the section 5 communicates with a branch line 4a leading to the brake cylinders 4 of the towing vehicle. Only one such cylinder is shown in FIG. 1 since the manner in which compressed air flowing into the line 4a in open position of the valve 3 operates the brakes of the vehicle A is well known and forms no part of this invention.

The trailer B accommodates a compressed air reservoir 9 which is connected with the relay valve 8 by a conduit 8a, and the braking system of my invention further comprises a supply line including a first section 11 which connects the tank 2 with the coupling member 6, and a second section which connects the coupling member 6 with the reservoir 9. This second section comprises two separable conduits including a first conduit 11a whose intake end is connected to the coupling member 6 and a second conduit whose portions 11b, 11c are connected by the relay valve 8 in such a way that the valve 8 prevents return flow of compressed air from the reservoir 9. The means for connecting the conduit 11a with the conduit 11b, 11c comprises a second detachable coupling E including a first hollow coupling element 12 connected to the discharge end of the conduit 11a and mounted at the rear end of the vehicle A, and a second coupling element 13 which is detachably connected with the coupling element 12 and which is affixed to the intake end of the conduit 11b, 11c.

A pipe 10a connects the relay valve 8 and the brake cylinders 10 of the trailer B, only one such cylinder being shown in FIG. 1.

Before proceeding with the description of the manner in which the braking system of FIG. 1 is put to use, I will first describe the construction of the couplings D, E which are respectively illustrated in FIGS. 2 and 4. FIG. 2 illustrates the coupling D in fully assembled position, i.e., the coupling members 6, 7 are connected with each other so that the section 5 is free to communicate with the section 5a and that the section 11 communicates with the section 11a–11c. The coupling member 6 comprises a hollow housing 6a which is provided with two inlet ports 15, 51a and with two outlet ports 17, 46. The inlet port 15 is formed with internal threads mating with external threads of a suitable nipple (not shown) provided at the discharge end of the section 5. The housing 6a has an internal chamber 16 which provides a passage between the ports 15, 17, the latter assuming the form of a vertical bore which opens into the underside of the housing. This port 17 accommodates a valve assembly serving as a means for normally sealing the discharge end of the line 5 from the port 17 or vice versa. As shown, the valve assembly comprises a hollow cylindrical sleeve 18 which is reciprocable in the outlet port 17 between a first axial position which is illustrated in FIG. 3 and in which the valve assembly is closed, and a second axial position which is shown in FIG. 2 and in which the valve assembly is open so that air admitted into the chamber 16 by the section 5 may flow through the sleeve 18 and through the coupling member 7 to enter the section 5a and the relay valve 8. The upper portion 19 of the sleeve 18, as viewed in FIGS. 2 and 3 is of larger outer diameter to form a flange which carries an external annular packing in the form of an O-ring 20, the latter sealingly engaging the cylindrical inner wall of the outlet port 17 to prevent bleeding of compressed air about the sleeve. The underside of the flange 19 defines an annular shoulder 21 which is moved into abutment with a stop means 22' when the sleeve 18 assumes the axial position of FIG. 3. This stop means is an annular retainer washer which is inserted into an annular groove of the wall bounding the outlet port 17 and which is maintained in such groove by a split ring 22.

The outer end portion of the sleeve 18 forms a nozzle 23 whose coaxial opening 23a may admit compressed air into the coupling member 7 and which defines an upwardly facing internal annular shoulder 24 for the lowermost convolution 25 of a resilient means here shown as a helical valve spring 26 which is accommodated in the sleeve 18 and whose uppermost convolution 27 biases a valve member or head in the form of a spring cap 28. The valve member 28 cooperates with an annular valve seat 29 whose sealing surface faces downwardly, as viewed in FIGS. 2 and 3, and which is screwed into the upper end portion of the flange 19. The valve member 28 is rigid with a coaxial stem 30 whose smaller-diameter neck portion 31 extends through the concentric opening of the seat 29 and which is provided with a disk-shaped collar 32, the latter located above the neck portion 31 and engaged by the lowermost convolution of a comparatively weak helical return spring 34 whose uppermost convolution engages an annular wall portion in the chamber 16 above the sleeve 18. The stem 30 further comprises an abutment member or extension 35 which is located above the collar 32 and which may engage a downwardly facing stop shoulder 36 provided on an internal annular boss 33 of the housing 6a.

A coaxial motion transmitting member or stud 37 which is rigid with and which is preferably integrally secured to the valve stem 30 extends upwardly through a bore 40 of the housing 6a and may abut with its upper end against the underside of a second valve member 47, the latter forming part of a second normally closed valve assembly mounted in an internal compartment 48 of the coupling member 6, this compartment constituting a passage between the ports 46 and 51a. The stud 37 is provided with a pair of spaced annular packings 38, 39 which sealingly engage the wall of the bore 40 to prevent flow of air between the chamber 16 and compartment 48. The packings 38, 39 are located at opposite sides of one or more radial ducts 41 machined into the stud 37 and communicating with an upwardly extending coaxial duct 42 whose open upper end 43 is sealed by the valve member 47 when the two valve assemblies are open. It will be noted that the outlet port 46 comprises a smaller-diameter inner portion 45 which communicates with the bore 40 and hence with the compartment 48 when the second valve assembly is open (see FIG. 2). The uppermost portion of the stud 37 is of reduced diameter, as between the packing 39 and the open end 43, to permit flow of compressed air thereabout when the valve member 47 is lifted from its seat 49, the latter shown as an integral annular part of the housing 6a.

When the stud 37 descends to the position of FIG. 3, i.e., when the return spring 34 moves the shoulder 21 into abutment with the washer 22', the port 46 is free to communicate with the atmosphere via ducts 42, 41 and via a radial orifice 44 formed in the housing 6a between the packings 38, 39. The open upper end 43 of the duct 42 is then spaced from the underside of the valve member 47, and the conduit 11a as well as the flexible portion 11b of the conduit 11b, 11c are then free to communicate with the atmosphere. However, the relay valve 8 prevents escape of compressed air from the reservoir 9.

In addition to the aforementioned valve member 47 and its seat 49, the second valve assembly comprises a valve spring 50 whose uppermost convolution bears against an internal shoulder provided in a hollow nipple 51 which is screwed into the upper end portion of the housing 6a and which defines the aforementioned inlet port 51a.

Adjacent to the outlet port 17, the coupling member 6 is provided with claws 52, 53 which engage complementary claws of the hollow coupling member 7 to maintain the coupling D in assembled position. The coupling member 7 is provided with an actuating means 7a which engages the sleeve 18 and maintains the latter in the position of FIG. 2 in which the abutment member 35 engages the stop shoulder 36 and in which the shoulder 21 is spaced from the washer 22'. The valve spring 26 is compressed because the stem 30 pushes the valve member 28 away from its seat 29 so that the section 5 is free to communicate with the section 5a via chamber 16, opening of the seat 29 and the opening 23a of the nozzle 23. The return spring 34 is also compressed because the collar 32 is close to the shoulder 36. At the same time, the stem 37 engages the underside of the valve member 47 and lifts it away from the seat 49 so that compressed air delivered by the section 11 may flow through the nipple 51, through the compartment 48, through the upper part of the bore 40 (i.e., about the smaller-diameter upper portion of the stud 37), through the inner portion 45 of the outlet port 46, and into the section 11a.

However, if the coupling member 7 is accidentally or intentionally detached from the claws 52, 53, the actuating member 7a moves away from the nozzle 23 and permits the valve spring 26 to expand; therefore, the valve member 28 is moved into sealing engagement with its seat 29 and the passage for flow of air between the port 15 and the opening 23a is closed. The spring 34 also expands and moves the shoulder 21 into abutment with the washer 22', thus entraining the stem 37 and permitting the spring 50 of the second valve assembly to move the valve member 47 into sealing engagement with the seat 49. The port 51a is now sealed from the port 46, but the latter is free to communicate with the orifice 44 because the open end 43 of the duct 42 is moved away from the underside of the valve member 47. Thus, the conduit 11a and the flexible portion 11b of the conduit 11b, 11c are free to communicate with the atmosphere.

The section 5a of the service line 5, 5a communicates with the atmosphere as soon as the coupling members 6, 7 are separated from each other. The relay valve 8 of the trailer B connects the reservoir 9 with the brake cylinder 10 so that the brakes of the trailer are now applied. The driver of the towing vehicle is bound to notice the fact that the trailer brakes are operative and reconnects the coupling members 6, 7 to restore the braking system to its operative condition. As a rule, the valve assembly 18, 26, 28, 29 preferably closes shortly before closing of the second valve assembly 47, 49, 50, i.e., the comparatively strong spring 26 prevents communication of air between the opening 23a and the port 15 before the motion transmitting stud 37 closes the second valve assembly against the bias of the spring 50, and the establishment of communicative connection between the port 46 and orifice 44 follows immediately thereafter.

FIG. 4 illustrates the construction of the second detachable coupling E. The housing 12a of the hollow coupling element 12 is provided with an inlet port 115 which is connected to the conduit 11a, with an outlet port 117 which accommodates a hollow sleeve 118 having a nozzle 123 provided with an opening 123a, and with an internal chamber 116 which connects the port 115 with the port 117. The flange 119 of the sleeve 118 is provided with an external O-ring 120 which sealingly engages the wall of the port 117 and carries a valve seat 129 adapted to cooperate with a valve member 128 mounted on a stem 130, the latter having its upper end portion, as viewed in FIG. 4, anchored in the housing 12a. The actuating member 13a in the hollow coupling element 13 maintains the sleeve 118 in an axial position in which the shoulder 121 is spaced from a washer 122' retained in the port 117 by a split ring 122. The valve spring 126 is compressed and the seat 129 is moved away from the valve member 128 because the rigidly mounted valve stem 130 cooperates with the actuating member 13a to maintain the spring 126 in compressed condition.

As soon as the claws of the coupling element 13 are accidentally or intentionally separated from the claws 152, 153 of the coupling element 12, the actuating member 13a releases the nozzle 123 and permits the spring 126 to return the sleeve 118 into abutment with the washer 122' or sufficiently close to such abutment so that the seat 129 is biased against the valve member 128 to seal the port 115 from the opening 123a. The discharge end of the conduit 11a is now sealed but the portion 11b of the conduit 11b, 11c is free to communicate with the atmosphere.

FIG. 5 illustrates a simplified coupling member 54 which may be utilized as a substitute for the coupling member 6 and which may cooperate with the coupling member 7 in a manner as shown in FIG. 2. The coupling member 54 comprises a hollow housing 54a which is provided with a first inlet port 55 connected to the section 5, with a second inlet port 71, 72 which is connected to the section 11, with a first outlet port 64 which accommodates a hollow sleeve 63, with a second outlet port 73, 74 which is connected to the conduit 11a of the section 11a-11c, and with an internal chamber 56, 61 which connects the ports 55, 64 with each other. The port 71, 72 may communicate with the port 73, 74 via port 64. The means for detachably connecting the coupling element 54 with the complementary coupling element 7 (not shown in FIG. 5) comprises claws 77, 78.

In the embodiment of FIG. 5, the two valve assemblies are operatively connected in such a way that they actually form an integral unit. The first valve assembly which normally seals the port 55 from the port 64 comprises the aforementioned sleeve 63, a perforated disk 75 which is secured to the upper end of the sleeve 63, as viewed in FIG. 5, a valve stem 76 which extends upwardly through a hollow annular valve seat 58 defined by the housing 54a, a valve member 57 which is located above the seat 58 and which abuts against the stem 76 at least when the latter lifts the valve member away from the seat 58, a cupped spring retainer 60 which is fixed to an upwardly extending coaxial pin 57a of the valve member 57, and a valve spring 59 which bears against the retainer 60 and against a cap 62 which is screwed into the upper end of the housing 54a to seal the chamber portion 61 from the atmosphere. The parts 57, 57a, 60 and 59 are accommodated in the chamber portion 61 which is coaxial with the port 64. The open upper end of the retainer 60 is provided with an outwardly extending radial flange 60a which is located above an inwardly extending annular collar 62a of the cap 62, the collar 62a serving as a means for guiding the cap 60 in its axial movements under or against the bias of the spring 59. The flange 60a is engaged by the collar 62a when an operator unscrews the cap 62 in order to remove the parts 59, 60 and 57 from the chamber portion 61. Adjacent to its nozzle 63a, the sleeve 63 is provided with a downwardly facing external annular shoulder 65 which comes to rest against a washer 66' (retained in the port 64 by a split ring 66) whenever the coupling member 54 is detached from the other coupling member corresponding to the member 7 of FIGS. 1 and 2.

The outer side of the sleeve 63 is provided with two spaced annular grooves for a pair of annular packings here shown as O-rings 68, 69 which sealingly engage the wall of the port 64 and which are disposed at the opposite axial ends of an annular channel or recess 70 provided in the periphery of a larger-diameter flange 67 forming part of the sleeve 63. This annular recess 70 always communicates with the smaller-diameter extension 71 of the port 71, 72 and it may also communicate with the extension 73 of the port 73, 74 when the actuating member 7a of the complementary coupling member engages and lifts the sleeve 63 against the bias of the spring 59 so that the shoulder 65 is moved away from the washer 66'. However, if the shoulder 65 is moved away from the washer 66', the stem 76 simultaneously moves the valve member 57 away from its seat 58 so that the opening 63b of the nozzle 63a communicates with the port 55 at the time when the ports 71, 72 and 73, 74 communicate with each other through the recess 70.

The operation of the valve assemblies in the coupling member 54 is as follows:

When the member 54 is coupled to a second coupling member, such as the member 7 of FIG. 2, the actuating means 7a moves the sleeve 63 upwardly from the axial position of FIG. 5 so that the stem 76 lifts the valve member 57 away from the seat 58 and the retainer 60 compresses the spring 59. The port 55 is now free to communicate with the opening 63b and, therefore, compressed air may flow between the sections 5 and 5a. The axial distance covered by the sleeve 63 in a direction to move the shoulder 65 away from the stop washer 66' is selected in such a way that, at the time the member 54 is properly coupled with the member 7, the recess 70 communicates with the extensions 71, 73 so that the section 11 communicates with the conduit 11a of the section 11a–11c. In other words, the two inlet ports are now free to communicate with the respective outlet ports as soon as the coupling embodying the member 54 is properly assembled.

It will be noted that the upper portion 67a of the sleeve 63 and the O-ring 69 together constitute a second valve assembly which is operatively connected with the valve assembly 57, 58, 59, 60, 63, 76 to automatically seal the port 71, 72 from the port 73, 74 when the port 55 is sealed from the opening 63a (i.e., when the coupling member 54 is accidentally or intentionally detached from the complementary coupling member), and to automatically provide a passage for flow of air between the sections 11 and 11a–11c when the sections 5 and 5a are free to communicate with each other. When the recess 70 establishes a connection between the ports 71, 72 and 73, 74, compressed air may flow from the source 1, 2 to the reservoir 9.

FIG. 5 illustrates the valve assemblies in a position they assume when the coupling embodying the member 54 is detached. The shoulder 65 bears against the stop washer 66' and the O-ring 69 seals the extension 73 from the extension 71. In other words, the section 11 is sealed from the conduit 11a. The stem 76 descends with the sleeve 63 and permits the spring 59 to move the valve member 57 into sealing engagement with the seat 58 so that the section 5 is sealed from the opening 63b. It will also be noted that, when the two valve assemblies are closed, i.e., when the shoulder 65 abuts against the washer 66', the port 73, 74 (and hence the conduit 11a) may communicate with the atmosphere through the inner part of the bore or part 64, through the apertured cover 75 and through the opening 63b. This means that pressure in the portion 11a, 11b of the section 11a–11c drops but the pressure in the portion 11c is maintained by the relay valve 8. Since the pressure in the section 5a drops as soon as the coupling embodying the member 54 of FIG. 5 is detached, the relay valve 8 connects the reservoir 9 with the brake cylinders 10 which actuate the brakes of the trailer B to thereby signal to the driver that the coupling in the service line 5, 5a is detached. Relay valves of such type are well known in the art of air-actuated braking systems.

An important advantage of my braking system over conventional braking systems of which I am aware at this time is that it may operate without utilizing a safety valve in that part thereof which is mounted in or on the towing vehicle. In conventional air-actuated braking systems, such second safety valve is a must, thus adding considerably to the cost of the braking system. Moreover, safety valves utilized in conventional air-actuated braking systems of towing vehicles respond only when the pressure in the entire system drops to a predetermined value; this means that, when the brakes are applied, substantial quantities of compressed air will escape before the safety valve on the towing vehicle becomes operative.

Without further analysis, the foregoing will so fully reveal the gist of the present invention that others can, by applying current knowledge, readily adapt it for various applications without omitting features that, which fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. A detachable coupling, particularly for connecting two sections of a service line and two sections of a supply line in air-actuated braking systems of towing vehicles and their trailers, said coupling comprising a first hollow coupling member having a first and a second inlet port and a first and a second outlet port; a normally closed first valve assembly mounted in said coupling member between said first inlet port and said first outlet port; a normally closed second valve assembly mounted in said coupling member between said second inlet port and said second outlet port; means operatively connecting said assemblies so that said second valve assembly opens automatically in response to opening of said first valve assembly; a second hollow coupling member detachably connected with said first coupling member; and actuating means provided in said second coupling member for automatically opening said first valve assembly when said coupling members are connected to each other.

2. A detachable coupling, particularly for connecting two sections of a service line and two sections of a supply line in air-actuated braking systems of towing vehicles and their trailers, said coupling comprising a first hollow coupling member having a first and a second inlet port and a first and a second outlet port; a normally closed first valve assembly mounted in said coupling member between said first inlet port and said first outlet port; a normally closed second valve assembly mounted in said coupling member between said second inlet port and said second outlet port; means operatively connecting said assemblies so that said second valve assembly opens automatically in response to opening of said first valve assembly; a second hollow coupling member detachably connected with said first coupling member; and actuating means provided in said second coupling member for automatically opening said first valve assembly when said coupling members are connected to each other so that a fluid admitted through said first inlet port may flow through said first valve assembly and into said hollow second coupling member, said first valve assembly simultaneously opening said second valve assembly to permit communication of a fluid between said second inlet port and said second outlet port.

3. A detachable coupling, particularly for connecting two sections of a service line and two sections of a supply line in air-actuated braking systems of towing vehicles and their trailers, comprising a first hollow coupling member having a first and a second inlet port and a first and a second outlet port, said first and second inlet ports respectively communicating with said first and second outlet ports; a normally closed first valve assembly mounted in said coupling member between said first inlet port and said first outlet port, said assembly comprising a hollow sleeve reciprocably received in said first outlet port and movable between a first and a spaced second axial position, an annular valve seat provided on and coaxial with said sleeve, a valve member adjacent to said valve seat, first and second stop means provided in said coupling member, said first stop means engaging said sleeve when the latter assumes said first axial position, resilient means for permanently biasing said valve member against said seat, and abutment means rigid with said valve member for engaging said second stop means before said sleeve reaches said second axial position so that said seat moves away from said valve member to provide a continuous passage from said first inlet means through said seat and said sleeve; a normally closed second valve assembly mounted in said coupling member between said second inlet port and said second outlet port; means comprising a motion transmitting member connected with said valve member for automatically opening said second valve assembly when said abutment means engages said second stop means so that said second valve assembly opens when said first inlet port communicates with said first outlet port; a second hollow coupling member detachably connected with said first coupling member; and actuating means provided in said second coupling member for automatically moving said sleeve to said second axial position when said coupling members are connected to each other.

4. A coupling as set forth in claim 3, wherein said second stop means is an internal shoulder in said first coupling member and wherein said abutment means is a valve stem secured to said valve member and rigid with said motion transmitting member.

5. A coupling as set forth in claim 3, wherein said first coupling member is provided with orifice means in communication with said second outlet port when said second valve assembly is closed, said motion transmitting member comprising means for sealing said orifice means from said second outlet port when said abutment means engages said second stop means and said second valve assembly is open.

6. A coupling as set forth in claim 3 further comprising return spring means mounted in said first coupling member and engaging said abutment means for permanently biasing said sleeve to said first axial position.

7. A coupling as set forth in claim 6 wherein said resilient means and said return spring are helical springs and the bias of said resilient means exceeds the bias of said return spring, said return spring being compressed when the sleeve is moved by said actuating means to said second axial position thereof.

8. A coupling as set forth in claim 3, wherein said second valve assembly comprises an annular seat rigid with said first coupling member, a valve member movable into and out of sealing engagement with said last mentioned seat, and a valve spring for biasing said last mentioned valve member against said last mentioned seat, said motion transmitting member moving said last mentioned valve member against the bias of said valve spring when said sleeve moves from said first to said second axial position thereof.

9. A detachable coupling, particularly for connecting two sections of a service line and two sections of a supply line in air-actuated braking systems of towing vehicles and their trailers, comprising a first hollow coupling member having a first and a second inlet port and a first and a second outlet port, said first outlet port consisting of an open-ended bore communicating with said first inlet port and said second inlet and outlet ports communicating with axially spaced portions of said bore; a normally closed valve assembly mounted in said coupling member between said first inlet port and the open end of said bore, said assembly comprising a hollow sleeve reciprocably received in said bore and movable between a first and a second axial position, said sleeve having a pair of axially spaced external packing means sealingly engaging said coupling member in said bore at opposite sides of said second inlet port, said sleeve defining with said packing means and with said coupling member a connecting channel in permanent communication with said second inlet port and communicating with said second outlet port when said sleeve is moved to said second axial position thereof, stop means provided in said coupling member for arresting said sleeve in said first axial position thereof, an annular valve seat provided in said coupling member between said sleeve and said first inlet port, a valve member adjacent to said seat, a valve spring for biasing said valve member into sealing engagement with said seat, and a motion transmitting stem connected with said sleeve for moving said valve member away from said seat when the sleeve is moved to said second axial position thereof; a second hollow coupling member detachably connected with said first coupling member; and actuating means provided in said second coupling member for automatically moving said sleeve to said second axial position when said coupling members are connected to each other.

10. A coupling as set forth in claim 9, wherein said second outlet port communicates with the atmosphere through said sleeve when said coupling members are detached from each other.

11. A coupling as set forth in claim 9, wherein said valve spring automatically returns said sleeve to said first axial position and simultaneously moves said valve member into sealing engagement with said seat when said coupling members are detached from each other.

12. An air-actuated braking system for towing vehicles and their trailers, comprising a source of compressed air mounted on the vehicle; a compressed air reservoir mounted on the trailer; a relay valve mounted on the trailer; conduit means connecting said valve with said reservoir; a service line comprising a first section connected with said source and a second section connected with said valve; a supply line having a first section connected with said source and a second section connected with said reservoir; a brake valve mounted on the vehicle in the first section of said service line; and a detachable coupling communicatively connecting said first sections with the respective second sections, said coupling comprising a first hollow coupling member mounted on the vehicle and having a first intake port connected with the first section of said service line, a second intake port connected with the first section of said supply line, a first outlet port, and a second outlet port connected with the second section of said supply line, a normally closed first valve assembly mounted in said coupling member between said first inlet port and said first outlet port, a normally closed second valve assembly mounted in said coupling member between said second inlet port and said second outlet port, said second valve assembly cooperating with said first valve assembly to automatically admit compressed air from the first to the second section of said supply line when said first valve assembly permits flow of air from said first inlet port to said first outlet port, a second hollow coupling member detachably connected with said first coupling member and secured to the second section of said service line, and actuating means provided in said second coupling member for automatically opening said first valve assembly when said coupling members are connected to each other so that said first sections communicate with the respective second sections, said first sections being automatically sealed from the respective outlet ports when one of said coupling members is detached from the other coupling member.

13. An air-actuated braking system for towing vehicles and their trailers, comprising a source of compressed air mounted on the vehicle; a compressed air reservoir mounted on the trailer; a relay valve mounted on the trailer; conduit means connecting said valve with said reservoir; a service line comprising a first section connected with said source and a second section connected with said valve; a supply line having a first section connected with said source and a second section connected with said reservoir; a brake valve mounted on the vehicle in the first section of said service line; a detachable coupling communicatively connecting said first sections with the respective second sections, said coupling comprising a first hollow coupling member mounted on the vehicle and having a first intake port connected with the first section of said service line, a second intake port connected with the first section of said supply line, a first outlet port, and a second outlet port connected with the second section of said supply line, a normally closed first valve assembly mounted in said coupling member between said first inlet port and said first outlet port, a normally closed second valve assembly mounted in said coupling member between said second inlet port and said second outlet port, said second valve assembly cooperating with said first valve assembly to automatically admit compressed air from the first to the second section of said supply line when said first valve assembly permits flow of air from said first inlet port to said first outlet port, a second hollow coupling member detachably connected with said first coupling member and secured to the second section of said service line, and actuating means provided in said second coupling member for automatically opening said first valve assembly when said coupling members are connected to each other so that said first sections communicate with the respective second sections, said first sections being automatically sealed from the respective outlet ports when one of said coupling members is detached from the other coupling member; the second section of said supply line comprising a first conduit connected to said second outlet port and a second conduit connected to said reservoir, and a second detachable coupling communicatively connecting said first conduit with said second conduit, said second coupling comprising a first hollow coupling element mounted on the vehicle and having an inlet port connected with said first conduit and an outlet port, a normally closed valve assembly mounted in said coupling element between said last mentioned inlet and outlet ports, a second hollow coupling element detachably connected with said first coupling element and secured to said second conduit, and actuating means provided in said second coupling element for automatically opening said last mentioned valve assembly when said coupling elements are connected to each other so that said conduits communicate with each other, said first conduit being automatically sealed from the outlet port of said first coupling element when one of said coupling elements is detached from the other coupling element.

14. A braking system as set forth in claim 13, wherein said relay valve comprises means for preventing return flow of compressed air from said reservoir to said second coupling element.

15. A braking system as set forth in claim 14, wherein said first coupling member is provided with orifice means connecting the second outlet port thereof with the atmosphere when the valve assemblies in said first coupling member are closed so that said first conduit communicates with the atmosphere when one of said coupling members is detached from the other coupling member.

16. A braking system as set forth in claim 13, wherein the valve assemblies in said first coupling member are coaxial with each other.

17. In an air-actuated braking system for towing vehicles and their trailers, a combination, a service line having a first section connectable with a brake valve of the towing vehicle and a second section connectable with a relay valve of the trailer; a supply line having a first section connectable to a source of compressed air on the towing vehicle and a second section connectable to a reservoir on the trailer, the second section of said supply line having a first conduit and a second conduit; a first detachable coupling having separable coupling elements respectively connected with said first and second conduits, normally closed valve means provided in one of said elements to prevent escape of compressed air when said elements are detached from each other, and actuating means provided in the other element for automatically opening said valve means when the elements are connected with each other; and a second detachable coupling comprising a first coupling member connected with said first sections and with said first conduit and having an outlet port, a second coupling member connected with the second section of said supply line and detachably connected with said first coupling member so that said outlet port may communicate with said last mentioned second section, a normally closed first valve assembly provided in said first coupling member for sealing the first section of said service line from said outlet port, a normally closed second valve assembly provided in said first coupling member for sealing the first section of said supply line from said first conduit, actuating means provided in said second coupling member for automatically opening said first valve assembly when said coupling members are connected to each other, and an operative connection between said assemblies for automatically opening said second valve assembly in response to opening of said first valve assembly.

18. In an air-actuated braking system for towing vehicles and their trailers, in combination, a service line having a first section connectable with a brake valve of the towing vehicle and a second section connectable with a relay valve of the trailer; a supply line having a first section connectable to a source of compressed air on the towing vehicle and a second section connectable to a reservoir on the trailer; and a detachable coupling comprising a first coupling member connected with said first sections and with the second section of said supply line and having an outlet port, a second coupling member connected with the second section of said service line and detachably connected with said first coupling member so that said outlet port may communicate with said last mentioned second section, a normally closed first valve assembly provided in said first coupling member for sealing the first section of said service line from said outlet port, a normally closed second valve assembly provided in said first coupling member for sealing the first section of said supply line from the second section of said supply line, actuating means provided in said second coupling member for automatically opening said first valve assembly when said coupling members are connected to each other, and an operative connection between said assemblies for automatically opening said second valve assembly in response to opening of said first valve assembly.

19. In an air-actuated braking system for towing vehicles and their trailers, in combination, a first air-conveying line having a first and a second section; a second air-conveying line having a first and a second section; and a detachable coupling comprising a first coupling member connected with said first sections and with one of said second sections and having an outlet port, a second coupling member detachably connected with said first coupling member and fixed to the other second section so that said other second section may communicate through said outlet port with the respective first section, a normally closed first valve assembly provided in said first coupling member for sealing said outlet port from the respective first section, a normally closed second valve assembly mounted in said first coupling member for sealing said one second section from the respective first section, actuating means provided in said second coupling member for automatically opening said first valve assembly when said coupling members are connected to each other, and an operative connection between said assemblies for automatically opening said second valve assembly in response to opening of said first valve assembly.

20. In an air-actuated braking system for towing vehicles and their trailers, in combination, a first air-conveying line having a first and a second section; a second air-conveying line having a first and a second section; a detachable coupling comprising a first coupling member connected with said first sections and with one of said second sections and having an outlet port, a second coupling member detachably connected with said first coupling member and fixed to the other second section so that said other second section may communicate through said outlet port with the respective first section, a normally closed first valve assembly provided in said first coupling member for sealing said outlet port from the respective first section, a normally closed second valve assembly mounted in said first coupling member for sealing said one second section from the respective first section, actuating means provided in said second coupling member for automatically opening said first valve assembly when said coupling members are connected to each other, and an operative connection between said assemblies for automatically opening said second valve assembly in response to opening of said first valve assembly; and a second detachable coupling provided in said one second section.

References Cited in the file of this patent

FOREIGN PATENTS

| | | |
|---|---|---|
| 1,052,838 | Germany | Mar. 12, 1959 |
| 1,186,497 | France | Feb. 23, 1959 |